United States Patent [19]

Sasaki et al.

[11] Patent Number: 4,857,363
[45] Date of Patent: Aug. 15, 1989

[54] PROCESS FOR PREPARATION OF SEMIPERMEABLE COMPOSITE MEMBRANE

[75] Inventors: Tatsuo Sasaki, Ohtsu; Hideo Fujimaki, Shiga; Tadahiro Uemura, Kyoto; Masaru Kurihara, Ohtsu, all of Japan

[73] Assignee: Toray Industries, Inc., Tokyo, Japan

[21] Appl. No.: 165,783

[22] Filed: May 2, 1988

Related U.S. Application Data

[62] Division of Ser. No. 906,175, Sep. 11, 1986, Pat. No. 4,758,343.

[30] Foreign Application Priority Data

Sep. 20, 1985 [JP] Japan .................................. 60-206219
Nov. 6, 1985 [JP] Japan .................................. 60-247139

[51] Int. Cl.$^4$ .......................... B05D 3/02; B05D 3/10; B05D 5/00
[52] U.S. Cl. ..................................... 427/245; 427/340; 427/342
[58] Field of Search ....................... 210/500.28, 500.38; 427/244, 245, 246, 340, 342

[56] References Cited

U.S. PATENT DOCUMENTS

| | | | |
|---|---|---|---|
| 3,133,132 | 5/1964 | Loeb et al. | 210/500.25 X |
| 3,133,137 | 5/1964 | Loeb et al. | 264/41 |
| 3,567,632 | 3/1971 | Richter et al. | 210/500.28 X |
| 4,214,994 | 7/1980 | Kitano et al. | 210/500.28 X |
| 4,242,208 | 12/1980 | Kawaguchi et al. | 210/500.28 |
| 4,259,183 | 3/1981 | Cadotte | 210/654 |
| 4,619,767 | 10/1986 | Kamiyama et al. | 210/490 |

FOREIGN PATENT DOCUMENTS

| | | |
|---|---|---|
| 0014054 | 8/1980 | European Pat. Off. . |
| 0085111 | 8/1983 | European Pat. Off. . |
| 2487213 | 1/1982 | France . |
| 56-500062 | 1/1981 | Japan . |
| 61-27083 | 2/1982 | Japan . |
| 57-27102 | 2/1982 | Japan . |

OTHER PUBLICATIONS

J. E. Cadotte et al., "Research on In Situ–Formed Condensation Polymer for Reverse Osmosis Membranes," pp. 10–17, PB–288387, MRI Report, Mar. 1978.
J. E. Cadotte et al., "Continued Evaluation of In Situ–Formed Condensation Polymers for Reverse Osmosis Membranes," Midwest Research Institute (PB–253193), Apr. 1976.
J. E. Cadotte et al., "Advanced Poly (Piperazineamide) Reverse Osmosis Membranes," FilmTec Corp. (PB–80–127574), 1979.

*Primary Examiner*—Evan Lawrence
*Attorney, Agent, or Firm*—Austin R. Miller

[57] ABSTRACT

A process for preparing a semipermeable composite membrane comprising a microporous substrate and an ultra-thin membrane covering the substrate, wherein the ultra-thin membrane comprises a crosslinked piperazine polyamide as a main component and contains a constituent component represented by the following general formula (I):

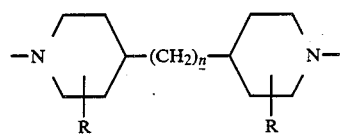

(I)

wherein R stands for —H or —CH$_3$ and n is an integer of from 0 to 3.

12 Claims, No Drawings

PROCESS FOR PREPARATION OF SEMIPERMEABLE COMPOSITE MEMBRANE

This is a division of application Ser. No. 906,175 filed Sept. 11, 1986, now U.S. Pat. No. 4,758,343.

BACKGROUND OF THE INVENTION

(1) Field of the Invention

The present invention relates to a process for preparation of a semipermeable membrane for selective permeation and separation of a specific component in a liquid mixture. More particularly, the present invention relates to a process for preparation of a high-performance semipermeable composite membrane which can be used for desalting brackish water to obtain potable water, for removing or recovering a contaminant or useful substance from waste water causing environmental pollution, such as dyeing waste water or electrodeposition paint waste water, to enable a closed system for the treatment of waste water and for producing ultra pure water to be used for the production of semiconductors.

(2) Description of a Related Art

As the semipermeable membrane heretofore industrially used, there can be mentioned an asymmetric membrane formed of acetyl cellulose, for example, a Loeb type membrane disclosed in the specification of U.S. Pat. No. 3,133,132 or U.S. Pat. No. 3,133,137. This membrane has problems in connection with the hydrolysis resistance, the microbiological resistance and the chemical resistance, and if it is intended to improve the permeability, a membrane having a good pressure resistance and durability cannot be obtained. Accordingly, membranes of this type are not practically broadly used though they are used in much limited regions. Research works have been made with a view to developing new materials free from these defects of the asymmetric membrane of acetyl cellulose, mainly in the U.S.A. and Japan. Materials in which some defects are eliminated, such as polyamides, polyamide-hydrazides (see the specification of U.S. Pat. No. 3,567,632), polyamide acids (see Japanese examined patent publication No. 55-37282), closslinked polyamide acids (see Japanese examined patent publication No. 56-3769), polyimidazopyrrolones, polysulfonamides, polybenzimidazoles, polybenzimidazolones, and polyarylene oxides, have been developed, but their selective separating property or permeability are inferior to those of the acetyl cellulose membrane.

As a semipermeable membrane of a type different from the Loeb type membrane, a composite membrane has been developed comprising a microporous substrate and an active layer substantially controlling membrane performance, which covers the microporous substrate. In this composite membrane, materials suitable for the intended use can be selected for the active layer and microporous substrate, and the freedom of the membrane-preparation technique is increased. Furthermore, although the Loeb type membrane must be stored in the wet state, the composite membrane can said to be stored in the dry state.

This composite membrane is divided into two types, that is, a type comprising an active layer coated on a microporous substrate through a gelled layer, and a type comprising an active layer coated directly on a microporous substrate. Specific examples of the former type are disclosed in Japanese unexamined patent publication No. 49-133282, Japanese examined patent publication No. 55-38164, PB Report 80-182090, Japanese examined patent publication No. 59-27202, and Japanese unexamined patent publication No. 56-40403. It is thought that the preparation of the membrane of the former type is easier than the preparation of the membrane of the latter type and much research has been made into the membrane of the former type. However, when the membrane is used for reverse osmosis under a low pressure, the water permeability is reduced and a satisfactory performance cannot be obtained. Moreover, it is difficult to obtain a membrane having enough chlorine resistance, which is an important factor for practical application to the reverse osmosis.

As specific examples of the membrane of the latter type, there can be mentioned membranes disclosed in the specification of U.S. Pat. No. 3,744,642, the specification of U.S. Pat. No. 3,926,798, Japanese unexamined patent publication No. 55-147106, the specification of U.S. Pat. No. 4,277,344, and Japanese unexamined patent publication No. 58-24303. In the composite membrane of this type, if a high permeability is desired, since the active layer is coated very thinly, defects are readily formed by flaws or foreign substances on the microporous supporting membrane, and it is considered generally difficult to manufacture a high-performance membrane stably with good reproducibility on an industrial scale. However, most membranes having chlorine resistance, heat resistance, and chemical resistance are those of the latter type. As the chlorine-resistant membrane, a piperazine type membrane (see the specification of U.S. Pat. No. 4,129,559) has attracted attention, and especially, a high water flux composite membrane composed of piperazine crosslinked with an aromatic polyfunctional acid halide has been proposed and has also attracted attention (see, for example, National Publication No. 56-50006, the specification of U.S. Pat. No. 4,259,183, and PB Report 288387). This membrane is excellent in that the water permeability is high even under a low pressure. However, the membrane is defective in that the sodium chloride rejection is relatively low, e.g., about 50%. In the desalination process and the production of ultra pure water for the production of semiconductors, a membrane having a high sodium chloride rejection is now desired, and improvements of the piperazine type composite membrane are proposed (see, for example, Japanese unexamined patent publication No. 59-179103 and Japanese examined patent publication No. 61-27083). These improvements, however, are not satisfactory because the water permeability is reduced, and a membrane exceeding the above-mentioned piperazine type composite membrane has not been developed.

SUMMARY OF THE INVENTION

We carried out research with a view to developing a process for preparation of a semipermeable composite membrane showing a high salt rejection and a high water flux even under a low pressure and having an oxidation resistance, by improving the above-mentioned piperazine type membrane (disclosed in the specification of U.S. Pat. No. 4,259,183). As a result, it was found that a high salt rejection can be obtained by combining piperazine with a polyfunctional secondary amine having a specific ring structure, and if a specific additive is used for the production of this semipermeable composite membrane, a high water flux can be obtained. We have now completed the present invention based on this finding.

More specifically, in accordance with one fundamental aspect of the present invention, there is provided a process for preparation of a semipermeable composite membrane comprising a microporous substrate and an ultra-thin membrane covering the substrate wherein the ultra-thin membrane comprises a crosslinked piperazine polyamide as a main component and contains a constituent component represented by the following formula (I)

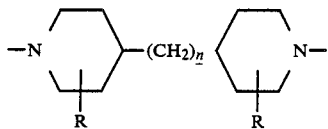
(I)

wherein R stands for —H or —CH₃ and n is an integer of from 0 to 3.

In accordance with another fundamental aspect of the present invention, there is provided a process for the preparation of semipermeable composite membranes, which comprises forming an ultra-thin membrane on a microporous substrate by interfacial polycondensation using an aqueous solution containing piperazine and a secondary amine represented by the following formula (III)

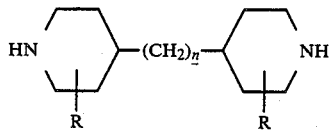
(III)

wherein R stands for —H or —CH₃ and n is an integer of from 0 to 3, and a solution of a polyfunctional acid halide in a water-immiscible organic solvent, wherein, incorporated in said aqueous solution, is at least one member selected from the group consisting of compounds represented by the following formulae (IV), (V) and (VI):

$$A-(SO_3Na)_n \text{ and} \qquad (IV)$$

$$\underset{SO_3Na \quad SO_3Na}{A-X-A'} \qquad (V)$$

wherein n is 1 or 2, A and A', which may be the same or different, stand for an aliphatic or aromatic hydrocarbon group, and X stands for —CH₂—, —O— or —S—, and

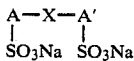 (VI)

wherein B stands for an aliphatic hydrocarbon group and n is an integer of from 1 to 6.

DESCRIPTION OF THE PREFERRED EMBODIMENTS

In the present invention, the ultra-thin membrane made by the process of this invention is composed of a crosslinked polyamide formed by interfacial polycondensation, which comprises a crosslinked piperazine polyamide having a constituent component of the formula

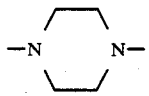

as a main component and contains a constituent component represented by the formula (I), and which shows a substantial separating capacity. The thickness of the ultra-thin membrane may be optionally chosen in the range of from 10 nm to 1,000 nm according to the intended object. However, if the thickness is small, flaws are readily formed, and if the thickness is large, the water permeation rate is reduced. Accordingly, preferably the thickness of the ultra-thin layer is 20 nm to 300 nm.

The crosslinked piperazine polyamide used in the present invention is a crosslinked polymer comprising as main components a constituent component of the formula

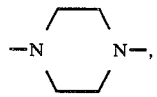

a substituted and/or unsubstituted aromatic ring, and an amide linkage connecting therebetween them, and this crosslinked polymer is disclosed in the specification of U.S. Pat. No. 4,259,183, PB Report 288387, and PB Report 80-127574. In the present invention, by incorporating a constituent component represented by the formula (I) in addition to the above-mentioned constituent components, a high salt rejection can be attained.

As the constituent component represented by the formula I, for example, there can be mentioned

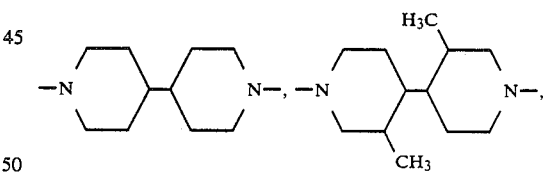

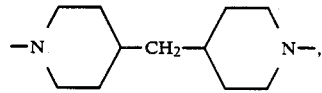

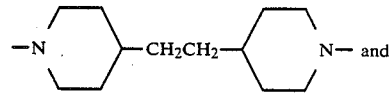

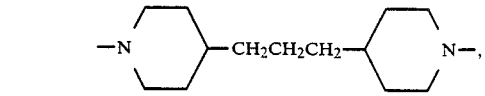

but in view of the performance of the composite semipermeable membrane,

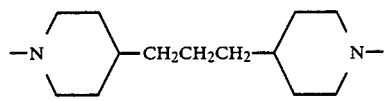

is most preferable.

The ratio between

and the constituent component represented by the formula (I) is not particularly critical, but in view of the performance of the semipermeable composite membrane, preferably the amount of the constituent component of the formula (I) is 0.05 to 0.5 part by weight per part by weight of the piperazine ring

Furthermore, a polymer may be added as another constituent component, and this polymer is effective for solving the problem of formation of defects by flaws or foreign substances on the microporous substrate. However, a polymer causing drastical degradation of the performance of the semipermeable composite membrane should be avoided. A constituent component having as main recurring units those represented by the following formula (II) is preferred:

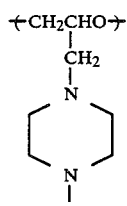

(II)

The content of the constituent component represented by the formula (II) is not particularly critical, but in view of the performance of the semipermeable composite membrane, preferably the amount of the constituent component of the formula (II) is 0.1 to 1.0 part by weight per part by weight of the piperazine ring

In the foregoing description, the kind and position of the substituent on the aromatic ring is not particularly critical. As the substituent, there may be optionally used lower alkyl groups such as methyl and ethyl groups, a methoxy group, an ethoxy group, a sulfonic acid group, sulfonic acid ester groups, a carboxylic acid group, carboxylic acid ester groups, an acyl group, halogens such as fluorine, chlorine, bromine and iodine, and a nitro group. In view of the separating performance of the membrane and the membrane-forming property, a methoxy group, a sulfonic acid group, and a carboxylic acid group are preferred. The position of the substituent is not particularly critical, but steric intricacy is not preferred. For example, the following structures can be mentioned:

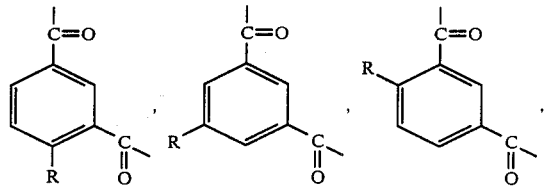

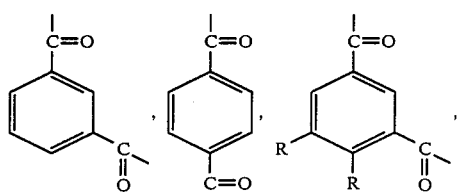

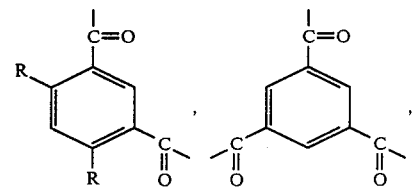

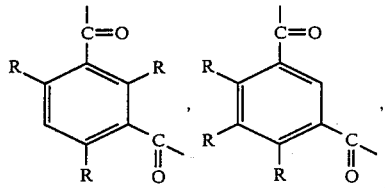

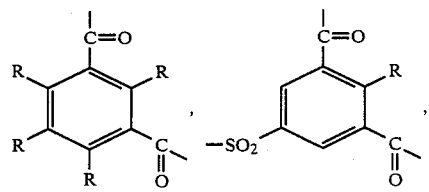

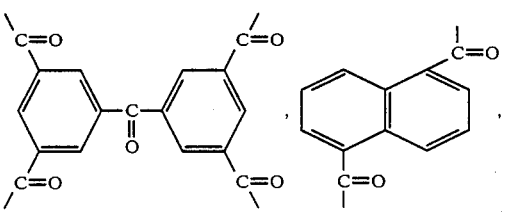

-continued

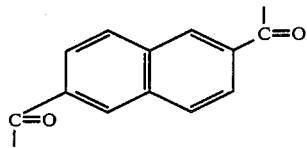

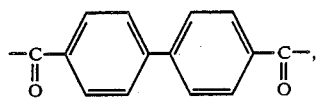

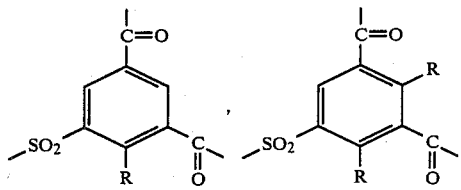

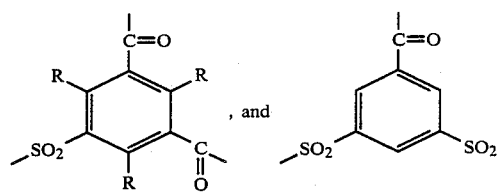

wherein R stands for a substituent such as a methoxy, sulfonic acid or carboxylic acid group.

In view of the performance of the composite semipermeable membrane, preferably the aromatic ring constituent component comprises at least one member selected from the group consisting of components represented by the following formulae:

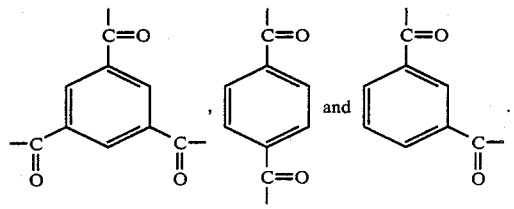

In the foregoing constituent components, as the group forming a covalent bond with the nitrogen atom (>N—), there can be mentioned a hydrogen atom forming a secondary amino group or carbonyl group forming an amide linkage. As the group forming a covalent bond with the carbon atom (>C=O), there can be mentioned a hydroxyl group forming a carboxylic acid group or an amino group forming an amide linkage. As the group forming a covalent bond with the sulfur atom (—SO$_2$—), there can be mentioned a hydroxyl group forming a sulfonic acid group or an amino group forming a sulfonamide linkage.

The method for incorporating these constituent components into the ultra-thin membrane having a substantial separating capacity is not particularly critical. However, in view of the handling property of the starting material and the ease of the membrane-forming operation, it is preferred that an ultra-thin film be formed by interfacial polycondensation using piperazine, a secondary amine represented by the following formula (II):

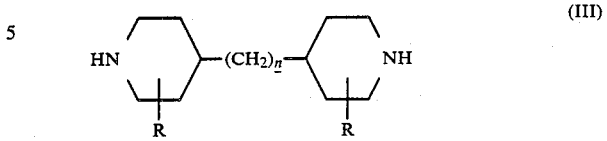

wherein R stands for —H or —CH$_3$ and n is an integer of from 0 to 3, if desired, a polyaminoether having recurring units represented by the following formula (VII):

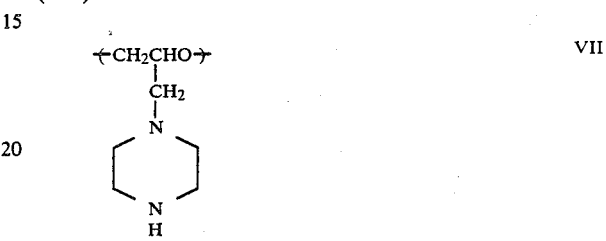

and an aromatic ring-containing polyfunctional acid halide represented by the following formula:

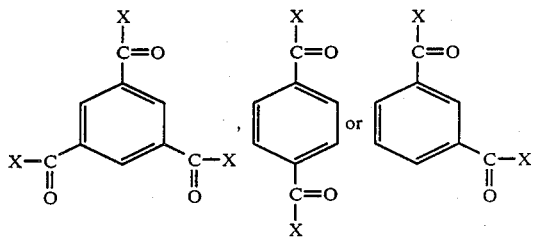

wherein X stands for —Cl, —Br, —I or —F.

In the present invention, the microporous substrate has no substantial separation capacity and exerts a function to support the above-mentioned ultra-thin membrane. The substrate has to have uniform fine pores or has fine pores of a size which is gradually increased from one surface toward the other surface. On one surface of the substrate, the pore size is preferably about 10 to about 100 nm. The microporous substrate may be selected from commercially available materials such as Milipore Filter VSWP and Toyo Filter Paper UK10, but ordinarily, the microporous substrate can be prepared according to the process disclosed in Office of Saline Water/Research and Development Progress Report, No. 359 (1968). As the material, there may be used homopolymers such as polysulfone, acetyl cellulose, nitrocellulose, polyvinyl chloride, and blends thereof. For example, a microporous substrate, the majority of the surface of which has fine pores having a diameter smaler than several ten nm, can be obtained by casting a solution of polysulfone in dimethylformamide (DMF) in a certain thickness on a densely woven polyester fabric or a nonwoven fabric and coagulating the polymer in an aqueous solution containing 0.5% by weight of sodium dodecyl sulfate and 2% by weight of DMF.

The preparation process according to the second aspect of the present invention will now be described.

The ultra-thin membrane having a substantial separation capacity in the semipermeable composite membrane of the present invention is formed by interfacial polycondensation using an aqueous solution of piperazine and the above-mentioned secondary amine represented by the formula (III) (hereinafter referred to as "composition") and a solution of the polyfunctional acid halide in a water-immiscible organic solvent. The present invention is characterized in that an additive is incorporated into the above-mentioned composition so as to greatly improve the water flux of the semipermeable composite membrane.

As the additive, there are used chemical agents represented by the above-mentioned formulae (IV), (V) and (VI). As specific examples, the following compounds can be mentioned:

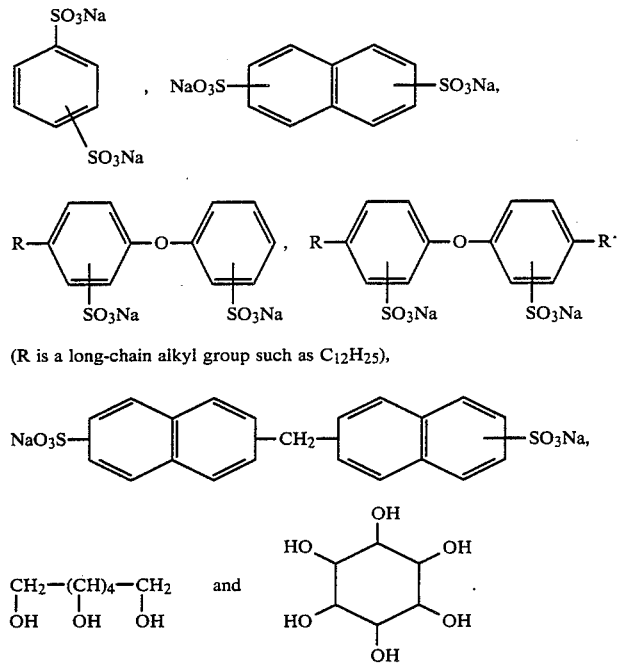

(R is a long-chain alkyl group such as $C_{12}H_{25}$),

Among them, sodium alkyldiphenylether disulfonate, methylene-bis(sodium napthalene-sulfonate) and sorbitol are preferred, and alkyldiphenyletherdisulfonic acid disodium salt is especially preferred because the performance of the composite semipermeable membrane is improved and it also acts as a surface active agent described below in the composition. In view of the surface-activating effect, a dodecyl group is preferred as the alkyl group, but practically, another alkyl group may be mixed with the dodecyl group, and two or more alkyl groups may be present.

The effect is further enhanced by the addition of an alkaline metal compound such as trisodium phosphate.

According to the preparation process of the present invention, the semipermeable composite membrane is prepared by coating the above-mentioned composition on at least one surface of a microporous substrate, air-drying and/or heating the coated membrane to evaporate a part or all of water, and coating a solution of a polyfunctional acid halide as the main component in a water immiscible organic solvent incapable of dissolving the porous substrate on the coated surface of the membrane to undergo a crosslinking reaction, followed by drying.

As pointed out hereinbefore, the composition for forming the semipermeable composite membrane of the present invention comprises preferably piperazine and 1,3-di-(4-piperidyl)-propane of the following formula:

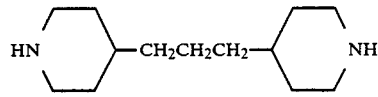

The concentration of these components is 0.1 to 10% by weight, preferable 1 to 4% by weight, and the mixing ratio between piperazine and 1,3-di-(4-piperidyl)-propane is preferably such that the amount of 1,3-di-(4-piperidyl)-propane is 0.05 to 0.5 part by weight per part by weight of piperazine. Furthermore, as pointed out hereinbefore, the mixing ratio between piperazine and the polyaminoether having recurring units of the formula (VII) is preferably such that the amount of the polyaminoether is 0.1 to 1.0 part by weight per part by weight of piperazine.

In order to improve the wettability of the composition on the surface of the porous substrate and to adhere the composition uniformly to the surface, a surface active agent, especially an anionic surface active agent, may be added to the composition. For example, sodium dodecyl sulfate and sodium alkylbenzenesulfonate may be used, and alkyldiphenyletherdisulfonic acid disodium salt is especially effective for obtaining a membrane with good performance. Generally, the surface active agent is used in an amount of 0.01 to 4% by weight. A water-soluble organic solvent not degrading the microporous organic solvent may be added to the composition.

Furthermore, addition of an alkaline metal salt, for example, a hydrochloric acid scavenger such as trisodium phosphate or sodium hydroxide, is effective for promoting the reaction between the secondary amine and the polyfunctional acid halide, and good effects are often obtained when a phase transfer catalyst or acylation catalyst is used in combination. Trisodium phosphate is especially preferred in view of the improvement of the water flux of the semipermeable composite membrane.

In the present invention, any of polyfunctional acid halides capable of reacting with the secondary amine to form a crosslinked polyamide as the ultra-thin membrane can be used. For example, aromatic polyfunctional acid halides such as trimesoyl halide, benzophenonetetracarboxylic acid halide, trimellitic acid halide, pyromellitic acid halide, isophthaloyl halide, terephthaloyl halide, naphthalenedicarboxylic acid halide, diphenyldicarboxylic acid halide, pyridinedicarboxylic acid halide, benzenedisulfonyl halide, and chlorosulfonylisophthaloyl halides can be used. In view of the solubility in the membrane-forming solvent and the performance of the semipermeable composite membrane, trimesoyl chloride, isophthaloyl chloride, terephthaloyl chloride, and mixtures thereof are preferred.

The mixing ratio of the acid chlorides is not particularly critical. However, in view of the water flux of the semipermeable composite membrane, the trimesoyl chloride/isophthaloyl chloride or trimesoyl chloride/terephthaloyl chloride weight ratio is preferably from 1/0 to 3/7, and single use of isophthaloyl chloride or terephthaloyl chloride is not preferred in view of the water flux.

The polyfunctional acid halide is generally used in the state dissolved in an organic solvent at a concentration of 0.01 to 2.0% by weight, preferably 0.1 to 0.5% by weight.

The organic solvent used in the present invention should be immiscible with water, be capable of dissolving the acid chloride therein, and not damage or destroy the microporous substrate and any organic solvent capable of providing a crosslinked polyamide by interfacial polymerization can be used.

For example, hydrocarbon compounds, cyclohexane, and trichlorotrifluoroethane may be preferably used. In view of the reaction speed and the volatility of the solvent, at least one member selected from n-hexane and trifluorotrichloroethane is preferably used, and when the safety problem, that is, ignitability, is further taken into consideration, trichlorotrifluoroethane is especially preferred.

Any know coating means can be adopted for coating the composition on the microporous supporting membrane. For example, there may be adopted a method in which the composition is coated on the substrate and a method in which the substrate is dipped in the composition. The method in which the composition is coated on the substrate is preferred because one surface of the microporous substrate can be uniformly coated with the composition and the operation can be easily accomplished. When the microporous substrate is dipped in the composition, it is preferable to adopt a means such that the composition does not adhere to the other surface of the microporous supporting membrane at the coating step. Generally, a liquid-removing step is arranged to remove the excessive composition applied at the coating step. As the liquid-removing means, there may be adopted, for example, a method in which the membrane surface is held vertically to allow the composition to naturally flow down.

The coated porous substrate is air-dried or heated in an oven at room temperature to 150° C. The drying period is changed according to the drying method, that is, the manner of introduction of heat or the kind of oven drier, but the drying period is generally within the range of from 0.5 minute to 60 minutes. Then, the solution of the polyfunctional acid halide in the water-immiscible organic solvent is coated on the substrate and after the liquid-removing operation, the coated membrane is air-dried or heated to obtain a semipermeable composite membrane. The drying operation is ordinarily carried out at room temperature to 150° C., and the drying time is determined according to the drying temperature. This drying or heating treatment is effective for preventing peeling of the ultra-thin membrane from the microporous substrate.

The so-obtained semipermeable composite membrane can be used as it is. However, the surface of the ultra-thin membrane of the semipermeable composite membrane can be covered with a protecting polymer membrane, and this protection is practically preferred. Application of the protective membrane on the surface of the ultra-thin membrane is accomplished by coating an appropriate polymer solution, followed by drying. As the protecting polymer, there can be mentioned, for example, water-soluble polymers such as polyvinyl alcohol, polyacrylic acid, and polyvinyl pyrrolidone. In view of the strength of the protecting membrane, polyvinyl alcohol is especially preferred.

The polymer is generally used in the form of an aqueous solution having a concentration of 0.5 to 10% by weight. Not only a dip-coating method but also a spray-coating method or a brush-coating method can be adopted for coating the polymer solution. The coated semipermeable composite membrane is dried in an oven to obtain a final product. It is generally preferred that the drying operation be carried out at 60° to 120° C. for 2 to 10 minutes.

The present invention will now be described in detail with reference to the following examples that by no means limit the scope of the invention.

In the examples, the sodium chloride rejection as the selective separation capacity was determined according to the customary method of measuring the electroconductivity. Furthermore, the water flux as the permeation capacity was determined by measuring the amount of water permeation per unit area per unit hour.

REFERENTIAL EXAMPLE

A taffeta having a size of 30 cm×20 cm and composed of polyester fibers (both wefts and warps were 150-denier multifilament yarns, the weave density was 90 yarns/inch in the warp direction and 67 yarns/inch in the weft direction, and the thickness was 160 μm) was fixed to a glass plate and a dimethylformamide (DMF) solution containing 16% by weight of polysulfone (Udel P-3500 supplied by Union Carbide Corporation) was cast in a thickness of 200 μm on the taffeta at room temperature (20° C.). The taffeta was immediately immersed in pure water and allowed to stand for 5 minutes to obtain a fiber-reinforced polysulfone substrate (hereinafter referred to as "FR-PS"). The pure water permeation coefficient of the so-obtained FR-PS (having a thickness of 210 to 215 μm) was 0.005 to 0.01 kg/cm$^2$.sec.atm as determined under a pressure of 1 kg/cm$^2$ at 25° C.

EXAMPLE 1

The FR-PS obtained in the Referential Example was coated with an aqueous solution (composition) containing 1.0% by weight of piperazine, 0.2% by weight of 1,3-di(4-piperidyl)-propane, 0.5% by weight of sodium dodecyl sulfate, and 1.0% by weight of trisodium phosphate, and was air-dried at room temperature for 2 minutes. Then, the supporting membrane was coated with a solution formed by dissolving a mixture of isophthaloyl chkoride/trimesoyl chloride (weight ratio=2/1) in an amount of 1.0 weight/volume% in trichlorotrifluoroethane and heat-treated at 100° C. for 5 minutes.

When the so-obtained composite membrane was subjected to the reverse osmosis test under a pressure of 15 kg/cm$^2$ at 25° C. by using an aqueous solution containing 0.15% of NaCl as the feed water for 14 hours, it was found that the salt rejection was 77% and the water flux was 2.4 m$^3$/m$^2$·day. When chlorine was added to this feed water and the test was carried out for 5 hours under conditions such that the residual chlorine concentration was 1 ppm and the pH value was 6.5, it was found that the salt rejection was 86% and the water flux was 2.2 m$^3$/m$^2$·day. Then, the residual chlorine was removed, and the operation was continued under the same conditions for 17 hours. It was found that the salt rejection was 86% and the water flux was 2.0 m$^3$/m$^2$·day, and it was confirmed that the chlorine resistance of the composite membrane was good.

EXAMPLES 2 THROUGH 7

The FR-PS obtained in the Referential Example was coated with an aqueous solution (composition) 1.0% by weight of piperazine, 0.2% by weight of 1,3-di-(4-piperidyl)-propane, 0.5% by weight of sodium dodecyl sulfate, and 1.0% by weight of trisodium phosphate, and was dried for 1 minute at 70° C. Then, the supporting membrane was coated with a solution obtained by dissolving a mixture of isophthaloyl chloride/trimesoyl chloride (weight ratio=2/1) in an amount of 0.5 weight/volume% in trichlorotrifluoroethane and was dried for 5 minutes with hot air at 100° C. Furthermore, sorbitol was added to the composition and the membrane preparation operation was conducted in the same manner as described above. The so-obtained composite membranes were subjected to the reverse osmosis test under the same conditions as Example 1. The obtained results are shown in Table 1.

TABLE 1

| Example No. | Sorbitol (% by weight) | Permeation Performance | |
|---|---|---|---|
| | | Salt Rejection (%) | Water Flux (m$^3$/m$^2$· day) |
| 2 | 0 | 70 | 1.7 |
| 3 | 0.05 | 72 | 1.8 |
| 4 | 0.1 | 73 | 2.1 |
| 5 | 0.2 | 74 | 2.2 |
| 6 | 0.3 | 71 | 2.3 |
| 7 | 0.4 | 70 | 2.4 |

EXAMPLE 8

The FR-PS obtained in the Referential Example was coated with an aqueous solution (composition) containing 1.0% by weight of piperazine, 0.2% by weight of 1,3-di-(4-piperidyl)-propane, 0.5% by weight of dodecyldiphenyletherdisulfonic acid disodium salt, and 1.0% by weight of trisodium phosphate, and was dried for 1 minute with hot air at 70° C. Then, the substrate was coated with a solution obtained by dissolving 0.5% by weight of trimesoyl chloride in trichlorotrifluoroethane and heat-treated for 5 minutes at 100° C. When the reverse osmosis test was carried out under the same conditions as Example 1, it was found that the salt rejection was 83% and the water flux was 2.3 m$^3$/m$^2$·day. When chlorine was added to the feed water so that the residual chlorine concentration was 1 ppm and the pH value was 6.5, and the test was conducted for 5 hours, it was found that the salt rejection was 94% and the water flux was 2.0 m$^3$/m$^3$·day. Then, the residual chlorine was removed and the operation was conducted for 17 hours under the same conditions. It was found that the salt rejection was 88% and the water flux was 2.0 m$^3$/m$^2$·day. As in the above-mentioned chlorine resistance test, hydrogen peroxide was added to feed water at a concentration of 1.0%, the operation was conducted for 8 hours, and the hydrogen peroxide was then removed. Before the addition of hydrogen peroxide, the salt rejection was 83% and the water flux was 2.2 m$^3$/m$^2$·day, and after the addition of hydrogen peroxide, the salt rejection was 87% and the water flux was 2.2m$^3$/m$^2$·day. Thus, it was confirmed that the membrane performance was not substantially changed. Furthemore, the heat resistance was tested by immersing the membrane in hot water at 95° C. for 4 hours. Before the heat resistance test, the salt rejection was 83% and the water salt rejection was 2.2m$^3$/m$^2$·day, and after the heat resistance test, the salt rejection was 82% and the water flux was 2.2m$^3$/m$^2$·day. It was found that the membrane performance was not substantially changed. Thus, it was confirmed that the membrane had good hydrogen peroxide resistance and good heat resistance.

Furthermore, the reverse osmosis test was carried out under a pressure of 15 kg/cm$^2$ at 25° C. by using an aqueous solution containing 0.1% of isopropyl alcohol as the feed water, and when the test was conducted for 12 hours, the isopropyl alcohol rejection was measured by gas chromatography. It was found that the rejection was 59%.

Furthermore, an aqueous solution containing 0.2% of MgSO$_4$, 0.15% of MgCl$_2$ or 0.2% of Na$_2$SO$_4$ was used as the feed water and the salt rejection was measured in the same manner as described above with respect to the removal of NaCl. The MgSO$_4$ rejection was 99.5%, the MgCl$_2$ rejection was 95%, and the Na$_2$SO$_4$ rejection was 99.9%.

EXAMPLE 9

The FR-PS obtained in the Referential Example was coated with an aqueous solution (composition) containing 1.0% by weight of piperazine, 0.2% by weight of 1,3-di-(4-piperidinyl)-propane, 0.3% by weight of water-soluble polyaminoether, 0.5% by weight of dodecyldiphenyletherdisulfonic acid disodium salt, and 1.0% by weight of trisodium phosphate, and was dried for 1 minute with hot air at 70° C. Then, the membrane was coated with a solution of 5% by weight of trimesoyl chloride in trichlorotrifluoroethane and was heat-treated for 5 minutes with hot air at 100° C. When the so-obtained composite membrane was subjected to the reverse osmosis test under the same conditions as adopted in Example 1, it was found that the salt rejection was 84% and the water flux was 2.7 m$^3$/m$^2$·day. Chlorine was added to the feed water so that the residual chlorine concentration was 1 ppm and the pH value was 6.5, and the test was conducted for 5 hours. It was found that the salt rejection was 94% and the water flux was 2.4 m$^3$/m$^2$·day. The residual chlorine was removed and the operation was continued for 17 hours under the same conditions. It was found that the salt rejection was 90% and the water flux was 2.5 m$^3$/m$^2$·day. As in the above-mentioned chlorine resistance test, hydrogen peroxide was added to the feed water at a concentration of 1.0% and the operation was conducted for 8 hours, and then, the hydrogen peroxide was removed. Before the addition of hydrogen peroxide, the salt rejection was 83% and the water flux was 2.6 m³/m²·day, and after the addition of hydrogen peroxide, the salt rejection was 85% and the water flux was 2.5 m³/m²·day. It was found that the performance of the membrane was not substantially changed.

EXAMPLE 10

The preparation of the membrane and the reverse osmosis test were carried out under the same conditions as described in Example 8 except that the content of trisodium phosphate in the composition was changed to 2.0% by weight. It was found that the salt rejection was 62% and the water flux was 4.4 m³/m²·day.

EXAMPLE 11

The FR-PS obtained in the Referential Example was coated with an aqueous solution (composition) containing 1.0% by weight of piperazine, 0.2% by weight of 1,3-di-(4-piperidyl)-propane, 2.0% by weight of dodecyldiphenyletherdisulfonic acid disodium salt, and 1.0% by weight of trisodium phosphate, and was dried for 30 seconds with hot air at 80° C. Then, the membrane was coated with a solution of 0.5% by weight of trimesoyl chloride in trichlorotrifluoroethane and was heat-treated for 5 minutes at 100° C. The obtained composite membrane was subjected to the reverse osmosis test under a pressure of 7.5 kg/cm² at a temperature of 25° C. and a pH value of 6.5 by using an aqueous solution containing 0.05% of NaCl as the feed water. When the test was conducted for 16 hours, it was found that the salt rejection was 82% and the water was 2.1 m³/m²·day.

EXAMPLE 12

The preparation of the membrane and the reverse osmosis test were carried out in the same manner as described in Example 11 except that methylene-bis (sodium naphthalene-sulfonate) was used instead of dodecyldiphenyletherdisulfonic acid disodium salt. It was found that the salt rejection was 82% and the water flux was 1.9 m³/m²·day.

EXAMPLE 13 THROUGH 18

The preparation of the membrane and the reverse osmosis test were carried out in the same manner as described in Example 11 except that acid chlorides shown in Table 2 were used and the concentration of dodecyldiphenyletherdisulfonic disodium salt was changed as shown in Table 2. The obtained results are shown in Table 2.

TABLE 2

| Example No. | Acid Chloride (% by weight) | Concentration (% by weight) of Dodecyldiphenyletherdisulfonic Acid Disodium Salt | Salt Rejection (%) | Water Flux (m³/m² · day) |
| --- | --- | --- | --- | --- |
| 13 | trimesoyl chloride (0.45) isophthaloyl chloride (0.05) | 0.8 | 78 | 2.2 |
| 14 | trimesoyl chloride (0.4) isophthaloyl chloride (0.1) | 1.0 | 78 | 2.4 |
| 15 | trimesoyl chloride (0.35) isophthaloyl chloride (0.15) | 1.0 | 77 | 2.0 |
| 16 | trimesoyl chloride (0.25) isophthaloyl chloride (0.25) | 1.5 | 74 | 2.3 |
| 17 | trimesoyl chloride (0.35) terephthaloyl chloride (0.15) | 1.5 | 73 | 2.0 |
| 18 | trimesoyl chloride (0.25) terephthaloyl chloride (0.25) | 2.0 | 78 | 2.1 |

Note
Test conditions: 7.5 kg/cm², 0.05% NaCl, 25° C., pH 6.5

EXAMPLE 19

The preparation of the membrane and the reverse osmosis test were carried out in the same manner as described in Example 11 except that the acid chloride composition and the concentration of dodecyldiphenyletherdisulfonic acid disodium salt concentration were changed as indicated in Table 3. Then, chlorine was added to the feed water so that the residual chlorine concentration was 10 ppm and the pH value was 6.5, and the operation was conducted for 100 hours. Then, the residual chlorine was removed, and the performance of the membrane was tested. The obtained results are shown in Table 3.

EXAMPLE 20

The procedures of Example 19 were repeated in the same manner except that 2% of hydrogen peroxide was added to the feed water instead of chlorine. The operation was conducted under a pressure of 2 kg/cm² for 12 hours and the hydrogen peroxide was removed. Then, the reverse osmosis test was carried out under a pressure of 7.5 kg/cm² at 25° C. by using an aqueous solution containing 0.05% of NaCl as the feed water. The obtained results are shown in Table 4.

TABLE 3

| Run No. | Acid Chloride (% by weight) | Concentration (% by weight) of Dodecyldiphenyletherdisulfonic Acid Disodium Salt | Salt Rejection (%) | Water Flux (m³/m² · day) | | (after removal of chlorine) Salt Rejection (%) | Water Flux (m³/m² · day) |
| --- | --- | --- | --- | --- | --- | --- | --- |
| 1 | trimesoyl chloride (0.5) | 0.8 | 80 | 2.0 | | 93 | 1.8 |
| 2 | trimesoyl | 1.5 | 76 | 2.0 | 10 ppm chlorine, | 87 | 2.0 |

TABLE 3-continued

| Run No. | Acid Chloride (% by weight) | Concentration (% by weight) of Dodecyl-diphenylether-disulfonic Acid Disodium Salt | Salt Rejection (%) | Water Flux ($m^3/m^2 \cdot$ day) | | Salt Rejection (%) (after removal of chlorine) | Water Flux ($m^3/m^2 \cdot$ day) (after removal of chlorine) |
|---|---|---|---|---|---|---|---|
| | chloride (0.35) isophthaloyl chloride (0.15) | | | | 100 hours, 7.5 kg/cm$^2$, 25° C., pH 6.5 | | |
| 3 | trimesoyl chloride (0.25) isophthaloyl chloride (0.25) | 1.5 | 76 | 2.1 | | 87 | 2.1 |

TABLE 4

| Run No. | Salt Rejection (%) | Water Flux ($m^3/m^2 \cdot$ day) | | Salt Rejection (%) (after removal of $H_2O_2$) | Water Flux ($m^3/m^2 \cdot$ day) (after removal of $H_2O_2$) |
|---|---|---|---|---|---|
| 1 | 86 | 1.9 | | 86 | 1.9 |
| 2 | 76 | 2.0 | 2% $H_2O_2$, 12 hours, 2 kg/cm$^2$, 25° C. | 78 | 2.0 |
| 3 | 76 | 1.9 | | 78 | 2.1 |

EXAMPLE 21

The membrane prepared in the same manner as described in Example 14 was subjected to the chlorine resistance test. Namely, chlorine was added to a 0.05% NaCl aqueous solution as the feed water so that the residual chlorine content was 10 ppm and the pH value was 6.5, and the operation was conducted for 100 hours under a pressure of 7.5 kg/cm$^2$. Then, the residual chlorine content was changed to 50 ppm and the operation was conducted for 115 hours. Then, the residual chlorine content was changed to 100 ppm and the operation was conducted for 120 hours. Before the addition of chlorine, the salt rejection was 82% and the water flux was 2.0 m$^3$/m$^2$·day, and after the addition of chlorine, the salt rejection was 80% and the water flux was 1.8 m$^3$/m$^2$·day. No substantial deterioration of the membrane was observed.

EXAMPLE 22

The membrane prepared in the same manner as described in Example 19 was subjected to the reverse osmosis test using isopropyl alcohol or an inorganic salt other than NaCl. The obtained results are shown in Table 5.

TABLE 5

| | Rejection (%) | | | |
|---|---|---|---|---|
| Run No. | 0.1% IPA Aqueous Solution | 0.2% MgSO$_4$ Aqueous Solution | 0.15% MgCl$_2$ Aqueous Solution | 0.2% Na$_2$SO$_4$ Aqueous Solution |
| 1 | 35 | 99.7 | 93.7 | 99.8 |
| 2 | 34 | 99.6 | 93.7 | 99.5 |
| 3 | 36 | 99.7 | 96.7 | 99.7 |

Note
Test conditions: 7.5 kg/cm$^2$, 25° C., pH 6.5

EXAMPLE 23

The composite membrane obtained in Example 14 was cut to an appropriate size and immersed in methylene chloride to separate the ultra-thin membrane layer from the supporting membrane. The ultra-thin membrane was recovered by suction filtration using a glass filter. Then, 30 mg of the recovered sample was hydrolyzed with 12 ml of 6N hydrochloric acid at 180° C. The liquid left after the removal of insoluble solids was dried to a solid state and the weight was measured. It was found that the weight was 25 mg. The solid was dissolved in a mixed solvent comprising 2 ml of methyl alcohol and 10 ml of ethyl ether and diazomethane was bubbled to the solution to esterify by methylation. The solvent was removed by distillation under reduced pressure, and 2 ml of methyl acetate and 0.5 ml of trifluoroacetic acid anhydride were added and left for 5 minutes. The solvent was removed by distillation under reduced pressure, the residue was dissolved in 1 ml of methyl alcohol, and the composition was analyzed by the GC-MS method.

In the mass spectrum, peaks of molecular ions and fragment ions corresponding to trifluoroacetyl compounds of piperazine and 1,3-di-(4-piperidyl)-propane, and methyl esters of trimesic acid and isophthalic acid were observed.

According to the gas-chromatographical analysis using the internal reference method, it was found that the weigh ratio of piperazine to 1,3-di-(4-piperidyl)-propane was about 1.0/0.2.

COMPARATIVE EXAMPLE 1

The FR-PS obtained in the Referential Example was coated with an aqueous solution (composition) containing 1.0% by weight of piperazine, 0.5% by weight of sodium dodecyl sulfate, and 1.0% by weight of trisodium phosphate, and was dried at room temperature for 2 minutes. Then, a solution obtained by dissolving 1.0 weight/volume% of a mixture(weight ratio=2/1) of isophthaloyl chloride/trimesoyl chloride in n-hexane was coated on the membrane, followed by air drying. When the so-obtained composite membrane was subjected to the reverse osmosis test under a pressure of 15 kg/cm$^2$ at 25° C. for 15 hours by using an aqueous solution containing 0.15% of NaCl as the feed water, it was found that the salt rejection was 54% and the water flux was 2.8 m$^3$/m$^2$·day.

COMPARATIVE EXAMPLE 2

The preparation of the membrane and the reverse osmosis test were carried out in the same manner as described in Comparative Example 1 except that trimesoyl chloride along was used as the acid halide. It was found that the salt rejection was 47% and the water flux was 1.8 m$^3$/m$^2$·day.

COMPARATIVE EXAMPLE 3

The preparation of the membrane and the reverse osmosis test were carried out in the same manner as described in Comparative Example 1 except that trichlorofluoroethane was used instead of n-hexane as the solvent for the acid halide. It was found that the salt rejection ratio was 58% and the water flux was 2.4 m$^3$/m$^2$·day.

COMPARATIVE EXAMPLE 4

The preparation of the membrane and the reverse osmosis test were carried out in the same manner as in Comparative Example 3 except that after coating of the trichlorofluoroethane solution of the acid halide, the coated membrane was heat-treated for 5 minutes at 100° C. It was found that the salt rejection was 55% and the water flux was 2.0 m$^3$/m$^2$·day.

COMPARATIVE EXAMPLE 5

The preparation of the membrane and the reverse osmosis test were carried out in the same manner as described in Comparative Example 4 except that an aqueous solution containing 1.0% by weight of 1,3-di-(4-piperidyl)-propane, 0.5% by weight of sodium dodecyl sulfate and 1.0% by weight of trisodium phosphate was used. It was found that the salt rejection was 64% and the water flux was 0.01 m$^3$/m$^2$·day.

As apparent from the foregoing description, the composite membrane of the present invention is for selective permeation and separation of a specific component in a liquid mixture and is used for desalting brakish water or producing ultra pure water for the production of semiconductors. The composite membrane has a high desalting and high water flux such that can rarely be attained by the conventional techniques. Furthermore, a membrane having good chlorine resistance and good hydrogen peroxide resistance can be provided.

We claim:

1. A process for the preparation of a semipermeable composite membrane, which comprises forming an ultrathin crosslinked polyamide membrane on a microporous substrate by interfacial polycondensation by contacting an aqueous solution containing piperazine and a secondary amine represented by the following formula (III):

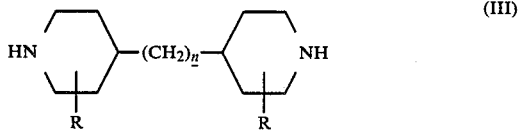
(III)

wherein R stands for —H or —CH$_3$ and n is an integer from 0 to 3, with a solution of a crosslinking polyfunctional acid halide in a water-immiscible organic solvent, wherein, incorporated in said aqueous solution, is at least one member selected from the group consisting of compounds represented by the following formulae (IV), (V) and (VI):

wherein n is 1 or 2, A and A', which may be the same or different, stand for an aliphatic or aromatic hydrocarbon group, and X stands for —CH$_2$—, —O— or —S—, and

wherein B stands for an aliphatic hydrocarbon group and n is an integer of from 1 to 6.

2. A process for the preparation of a semipermeable composite membrane according to claim 1, wherein formation of the ultra-thin membrane by the interfacial polycondensation is accomplished by coating the aqueous solution containing piperazine and the secondary amine represented by the formula (III) on the microporous substrate, removing a part or all of water in the aqueous solution by drying, coating the solution containing the polyfunctional acid halide in the water-immiscible organic solvent on the coated substrate, performing polycondensation in the interface with the aqueous solution to form a crosslinked polymer and, then, drying and heat-treating the formed crosslinked polymer.

3. A process for the preparation of a semipermeable composite membrane according to claim 1, wherein the compound of the formula (VI) or (V) is a sodium salt of an aromatic disulfonic acid.

4. A process for the preparation of a semipermeable composite membrane according to claim 1, wherein the compound of the formula (VI) is sorbitol.

5. A process for the preparation of a semipermeable composite membrane according to claim 1, wherein sodium phosphate is further incorporated in the aqueous solution containing piperazine and the secondary amine represented by the formula (III).

6. A process for the preparation of a semipermeable composite membrane according to claim 1, wherein the secondary amine represented by the formula (III) is 1,3-di(4-piperidyl)-propane.

7. A process for the preparation of a semipermeable composite membrane according to claim 1, wherein a polyaminoether having main recurring units represented by the following formula (VIII)

 (VII)

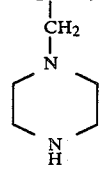

is incorporated in the aqueous solution containing piperazine and the secondary amine represented by the formula (III).

8. A process for the preparation of a semipermeable composite membrane according to claim 1, wherein the polyfunctional acid halide is a polyfunctional acid chloride.

9. A Process for the preparation of a semipermeable composite membrane according to claim 1, wherein the polyfunctional acid halide is at least one member selected from the group consisting of trimesoyl halides, terephthaloyl halides and isophthaloyl halides.

10. A process for the preparation of a semipermeable composite membrane according to claim 1, wherein the organic solvent is at least one member selected from the group consisting of n-hexane and trifluorotrichloroethane.

11. A process for the preparation of a semipermeable composite membrane according to claim 1, wherein the microporous substrate is composed of a polysulfone.

12. A process for the preparation of a semipermeable composite membrane according to claim 1, wherein the microporous substrate is reinforced by a fabric composed mainly of at least one member selected from the group consisting of polyesters and aromatic polyamides.

* * * * *

UNITED STATES PATENT AND TRADEMARK OFFICE
CERTIFICATE OF CORRECTION

PATENT NO. : 4,857,363

DATED : Aug. 15, 1989

INVENTOR(S) : Tatsuo Sasaki, Hideo Fujimaki, Tadahiro Uemura, Masaru Kurihara

It is certified that error appears in the above-identified patent and that said Letters Patent is hereby corrected as shown below:

Column 20, line 36 (Claim 3, line 3), change "(VI)" to --(IV)--.

Column 20, line 53 (Claim 7, line 4), change "(VIII)" to --(VII)--.

Signed and Sealed this

Twenty-eighth Day of May, 1991

Attest:

HARRY F. MANBECK, JR.

Attesting Officer

Commissioner of Patents and Trademarks